Figure 6:
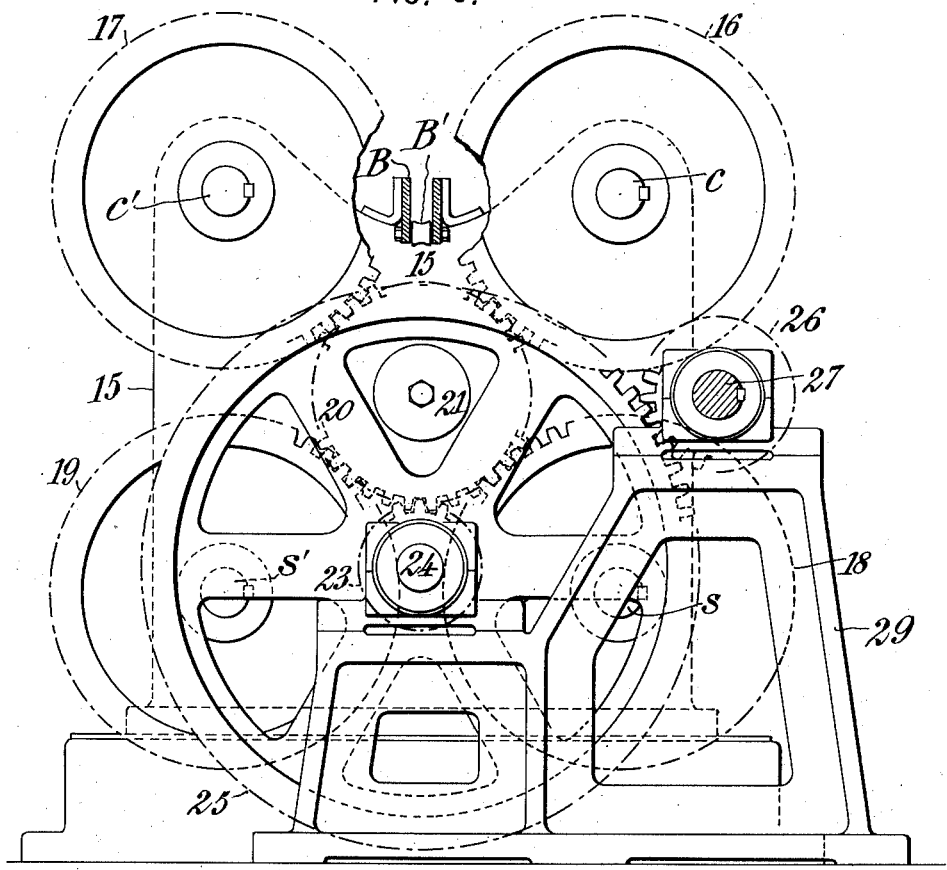

J. A. EDEN, Jr.
MACHINE FOR MAKING STAY BOLTS AND THE LIKE.
APPLICATION FILED MAR. 9, 1907.
927,514.
Patented July 13, 1909.
8 SHEETS—SHEET 1.
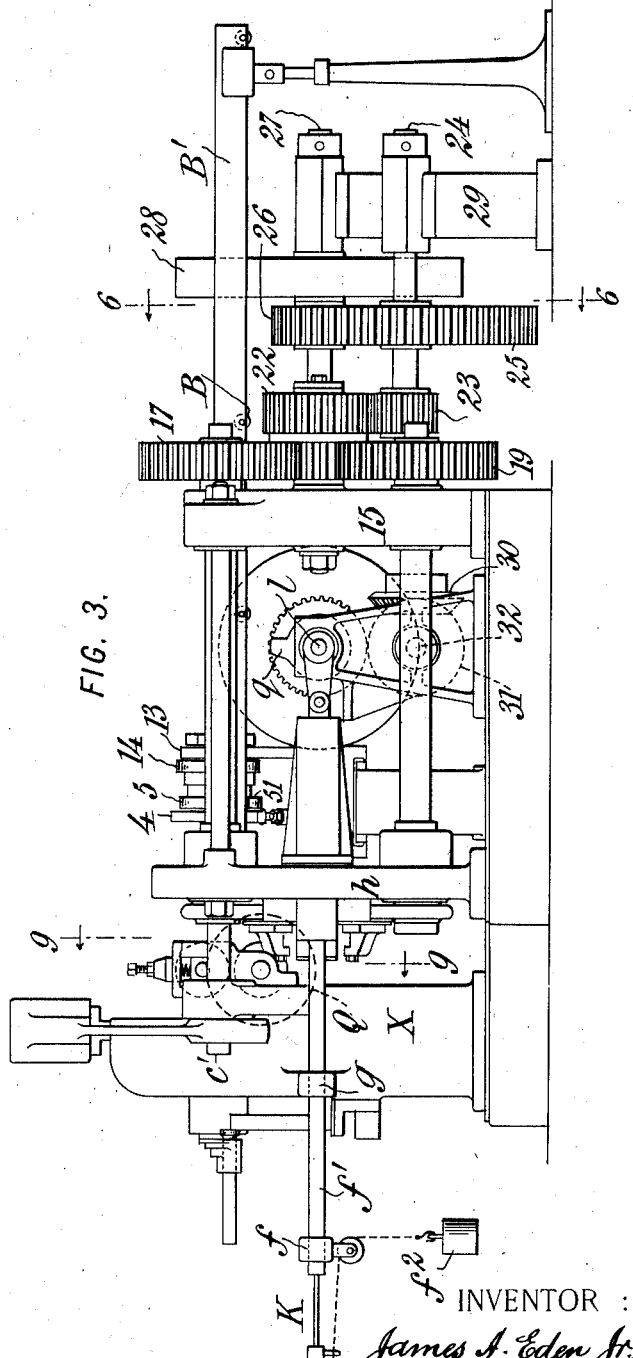
WITNESSES:
INVENTOR:
James A. Eden Jr.
By Attorneys, J. A. EDEN, Jr.
MACHINE FOR MAKING STAY BOLTS AND THE LIKE.
APPLICATION FILED MAR. 9, 1907.
927,514.
Patented July 13, 1909.
8 SHEETS—SHEET 2.
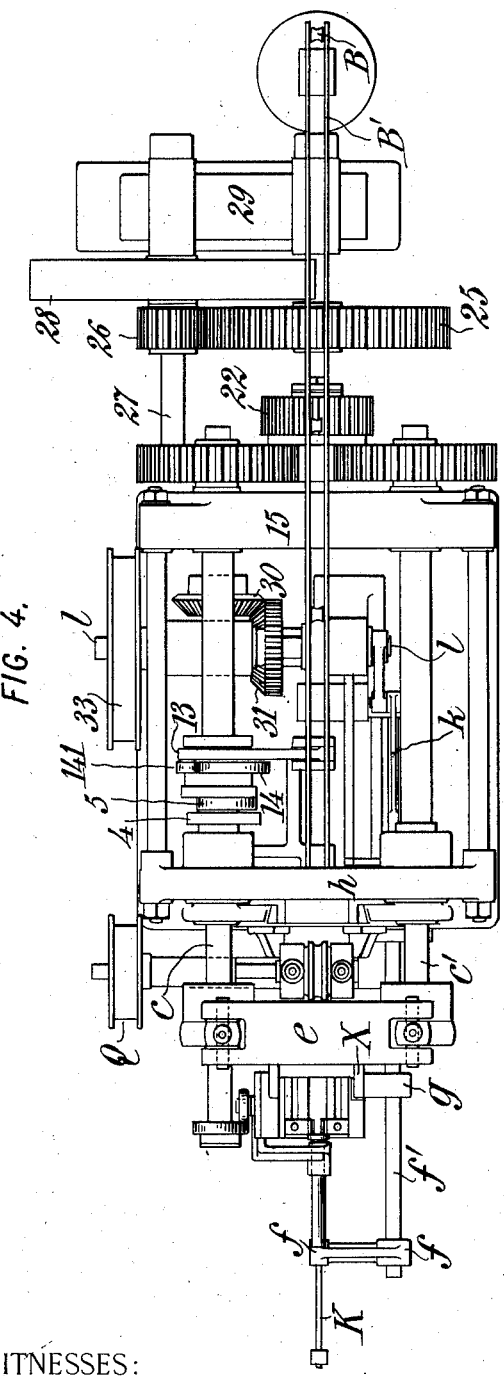
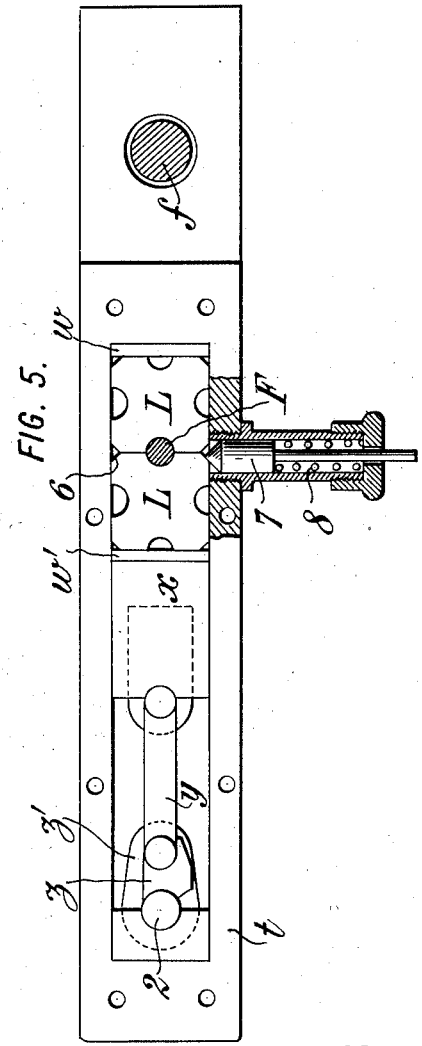
WITNESSES:
INVENTOR:
James A. Eden, Jr.
By Attorneys, J. A. EDEN, Jr.
MACHINE FOR MAKING STAY BOLTS AND THE LIKE.
APPLICATION FILED MAR. 9, 1907.

927,514.

Patented July 13, 1909.
8 SHEETS—SHEET 3.

WITNESSES:

INVENTOR:
James A. Eden, Jr.
By Attorneys,

J. A. EDEN, Jr.
MACHINE FOR MAKING STAY BOLTS AND THE LIKE.
APPLICATION FILED MAR. 9, 1907.

927,514.

Patented July 13, 1909.
8 SHEETS—SHEET 4.

WITNESSES:

INVENTOR:
James A. Eden Jr.
By Attorneys.

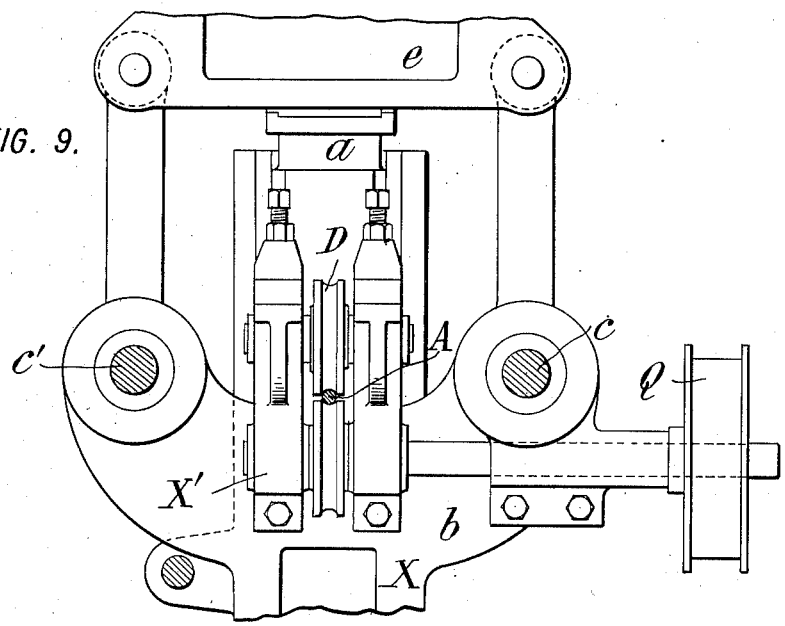
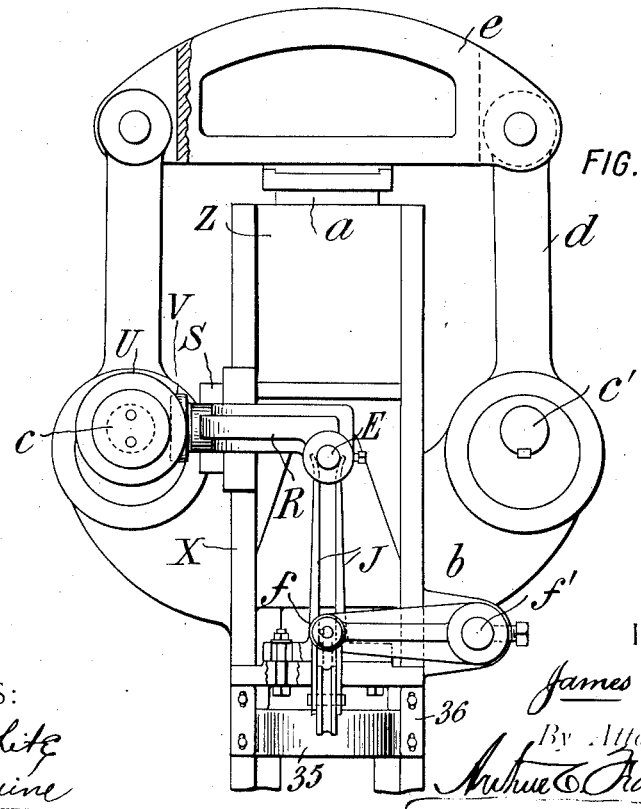

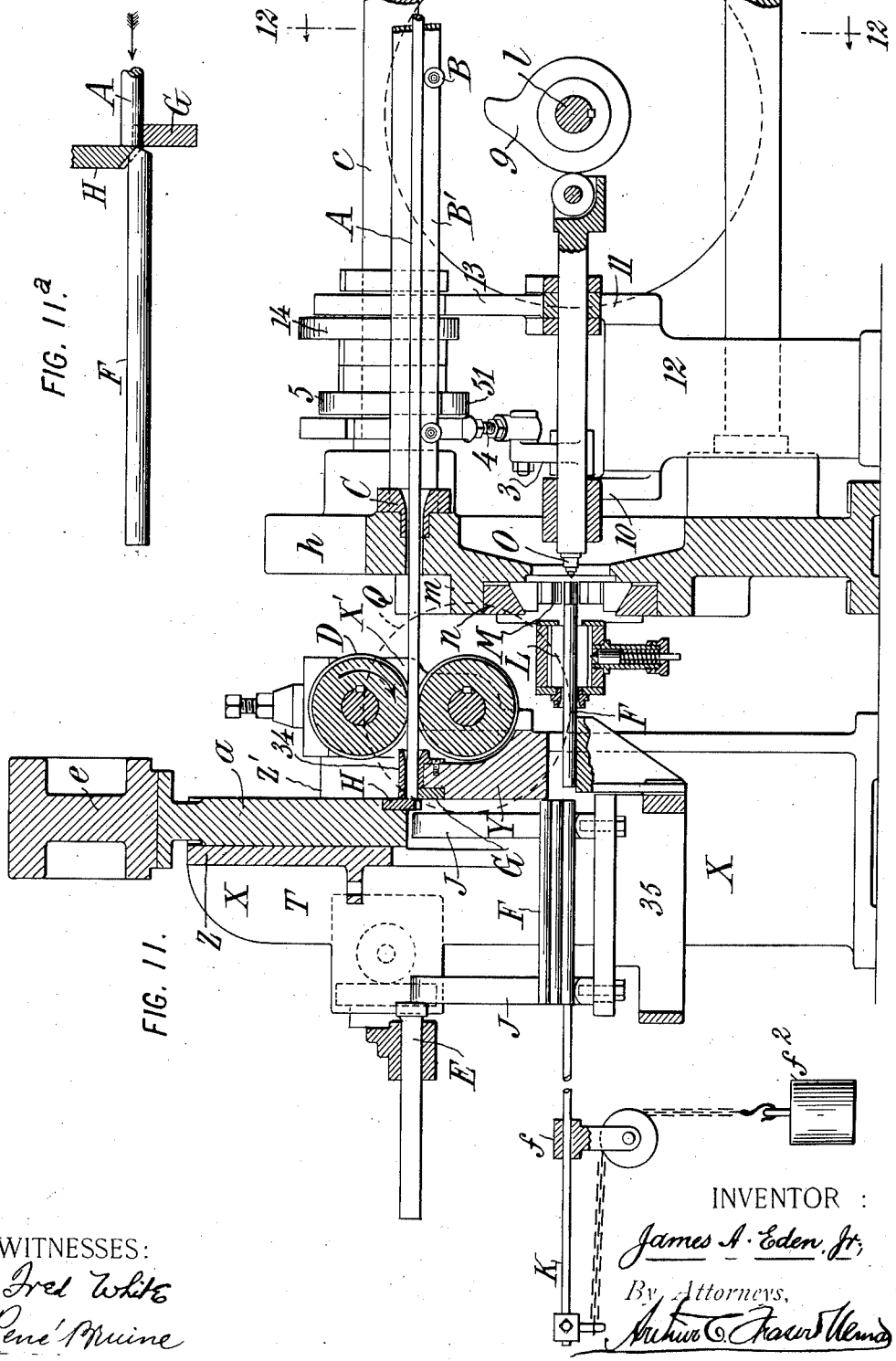

J. A. EDEN, Jr.
MACHINE FOR MAKING STAY BOLTS AND THE LIKE.
APPLICATION FILED MAR. 9, 1907.

927,514.

Patented July 13, 1909.
8 SHEETS—SHEET 7.

WITNESSES:
Fred White
René Muine

INVENTOR :
James A. Eden, Jr.
By Attorneys,
Arthur E. Chaser & Meina

J. A. EDEN, Jr.
MACHINE FOR MAKING STAY BOLTS AND THE LIKE.
APPLICATION FILED MAR. 9, 1907.

927,514.

Patented July 13, 1909.
8 SHEETS—SHEET 8.

WITNESSES:
Fred White
René Muine

INVENTOR:
James A. Eden Jr.
By Attorneys,

UNITED STATES PATENT OFFICE.

JAMES A. EDEN, JR., OF NEW YORK, N. Y., ASSIGNOR TO E. W. BLISS COMPANY, OF BROOKLYN, NEW YORK, A CORPORATION OF WEST VIRGINIA.

MACHINE FOR MAKING STAY-BOLTS AND THE LIKE.

No. 927,514.   Specification of Letters Patent.   Patented July 13, 1909.

Application filed March 9, 1907. Serial No. 361,552.

*To all whom it may concern:*

Be it known that I, JAMES A. EDEN, Jr., a citizen of the United States, residing in the borough of Brooklyn, county of Kings, city and State of New York, have invented certain new and useful Improvements in Machines for Making Stay-Bolts or the Like, of which the following is a specification.

Stay-bolts for boilers are ordinarily provided with a short screw-thread at each end by which they are attached to the opposite plates of a boiler before the slightly projecting ends are cut off and swaged to clamp the plates, and are drilled from the outer end inward a sufficient distance to permit the escape of water or steam when a bolt breaks between the two plates, and thus to indicate the fact of a break.

The present machine is designed to manufacture rapidly and cheaply bolts or blanks of proper lengths with squared heads by which they may be screwed into the plates, and with their outer ends slightly punched to facilitate the centering of the drill in the subsequent operation of drilling. The forming of the squared (or otherwise non-circular) heads of the bolts is effected by means of powerful radially moving jaws which swage the blanks, compressing the cold metal to the desired shape in cross-section. The blanks are preferably cut in the same machine from a rod, and automatically fed to said jaws, and the jaws effect the squaring of the blank to the desired extent at a single operation, and while the blank is held between the jaws the center punch is forced into the head of the blank to make the desired indentation, this combination of automatic operations serving to turn out the product at an extremely rapid rate. Various other points of advantage are referred to in detail hereinafter.

The accompanying drawings illustrate an embodiment of the invention.

Figure 18:
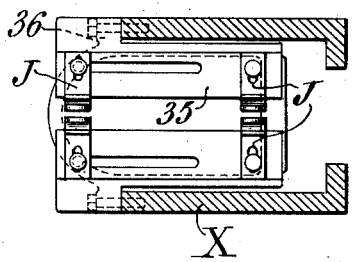
Figure 19:
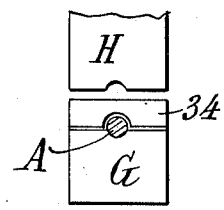
Figure 7:
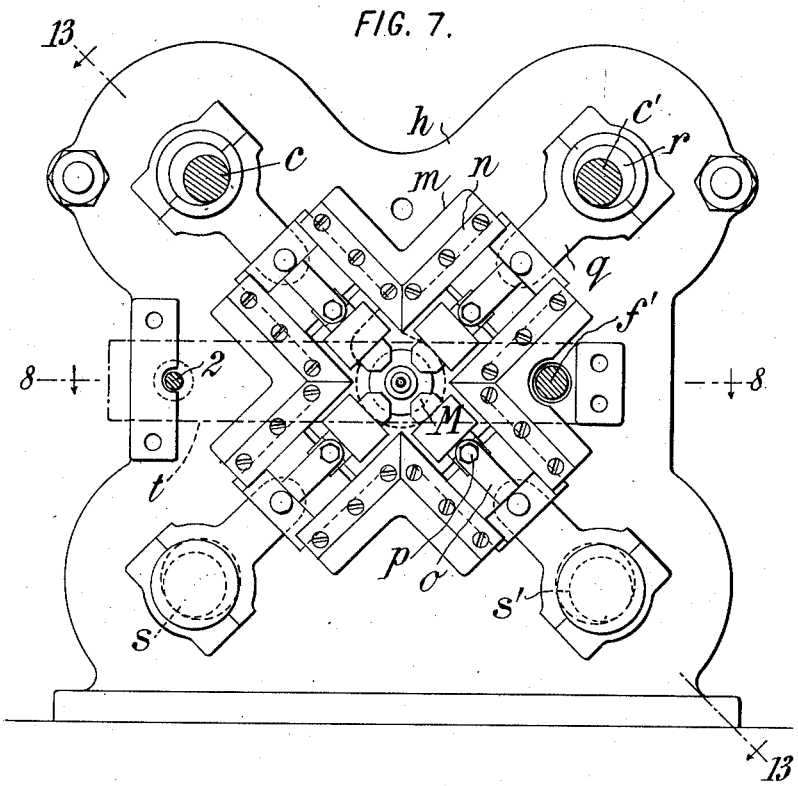
Figure 8:
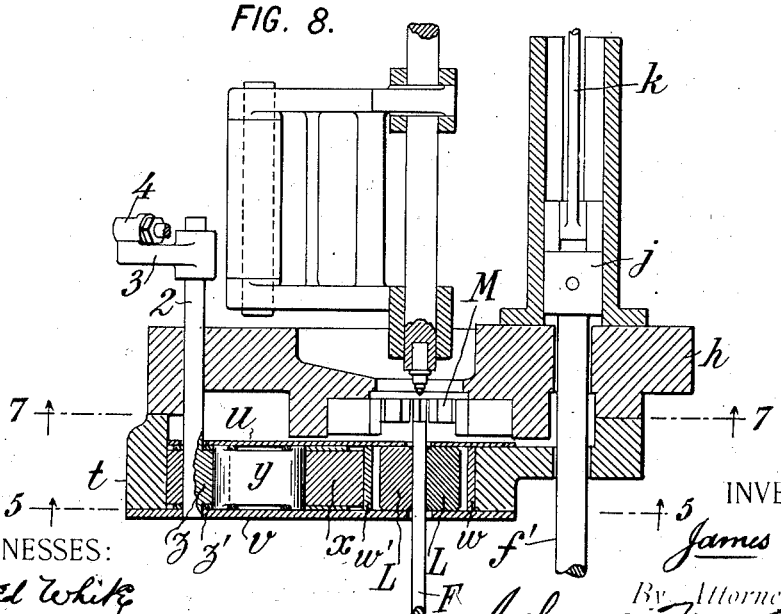
Figure 12:
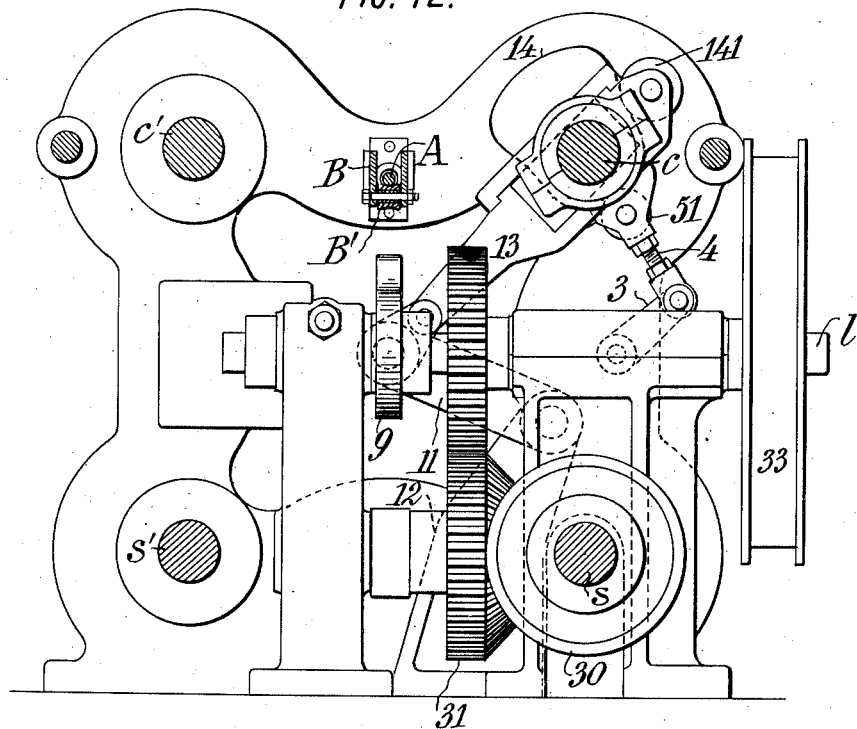
Figure 13:
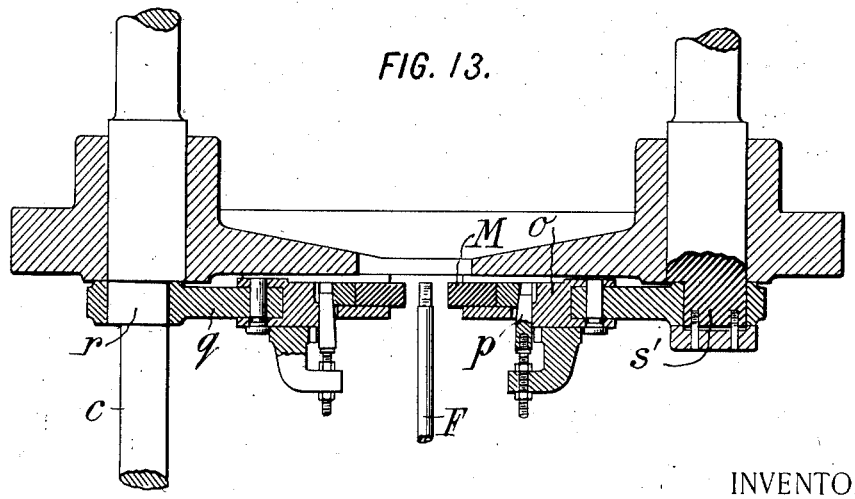
Figure 14:
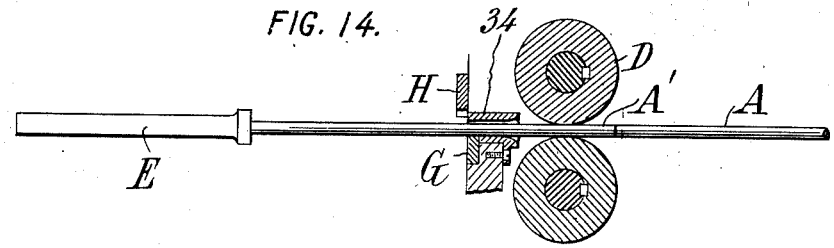
Figure 15:
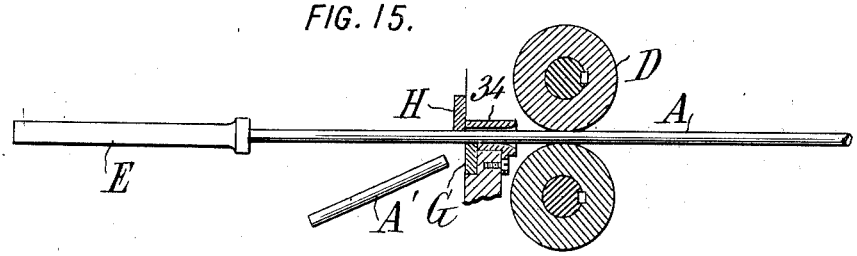
Figure 16:
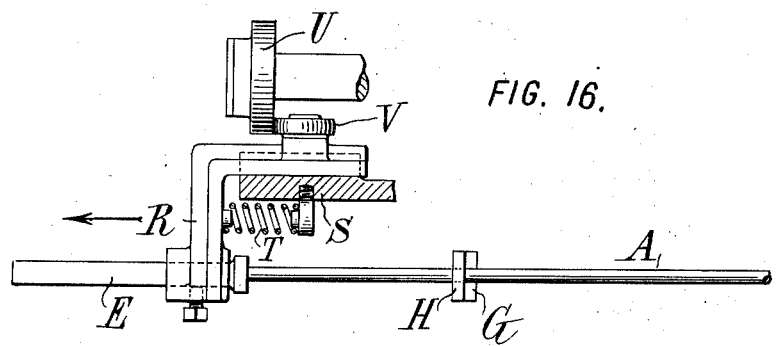
Figure 17:
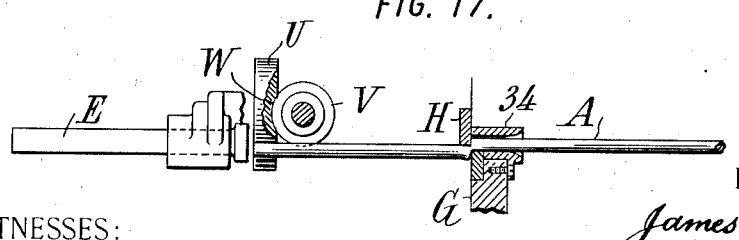

Figures 1 and 2 are respectively a side and an end elevation of the product of the machine. Fig. 3 is a side elevation of the complete machine. Fig. 4 is a plan of the same. Fig. 5 is a transverse vertical section through the clamping jaws, taken approximately on the line 5—5 of Fig. 8. Fig. 6 is an end elevation of the rear frame, showing the various driving connections. Fig. 7 is an end elevation of the front frame carrying the squaring jaws or dies, and taken approximately on the line 7—7 of Fig. 8. Fig. 8 is a cross-section approximately on the line 8—8 of Fig. 7. Fig. 9 is a partial elevation from the inner side of the shear frame, taken approximately on the line 9—9 of Fig. 3. Fig. 10 is an elevation of the shear frame from the opposite end. Fig. 11 is a longitudinal vertical section through the principal parts which act directly on the work. Fig. 11$^a$ is a side elevation showing the distortion of one end of the blank in shearing it. Fig. 12 is a transverse vertical section taken approximately on the line 12—12 of Fig. 11, and illustrating the sidewise movement of the punch. Fig. 13 is an oblique section through the squaring dies, taken approximately on the line 13—13 of Fig. 7. Figs. 14 and 15 are diagrams indicating the operation of the machine when the end of a long rod is reached. Figs. 16 and 17 are diagrams illustrating the action of the end stop in connection with the shearing blades. Fig. 18 is a plan of the magazine. Fig. 19 is an elevation on the line 19—19, Fig. 11, with the upper blade raised.

Referring to the embodiment of the invention illustrated, and especially to Fig. 11, a continuous long rod A, or a succession of such rods, of circular cross-section, is supported upon rollers B between side plates B', and passes through a guide C to a pair of rapidly rotating feed rollers D which push the advance end of it against a gage or stop E, whereupon the projecting portion F, constituting a blank of the desired length, is sheared off between a lower fixed shear blade G and an upper moving blade H. The blanks F, as they are sheared off, fall into a receptacle composed of two pairs of narrow vertical guides J, one pair near each end, and the guides of each pair being separated only sufficiently to permit the free movement of the blanks so that they are stacked vertically as indicated. A pusher K then pushes out endwise the lowest of the stack of blanks F, pushing it to a position approximately under the rollers D. Here it is clamped by clamping jaws L operating horizontally (see Fig. 5), the end of it lying within a set of squaring jaws M operating obliquely, as shown in Fig. 7. Here the jaws come together, and at one operation produce the squared or approximately squared head N (Figs. 1 and 2) by swaging the cold metal. At the same time the punch O is forced slightly into the end of the head to form the recess P. The blank is then completed, as far as the work of this machine is concerned, and the clamping jaws and squaring jaws are withdrawn, and the center punch is swung laterally out of line with the blank, which is ejected endwise by the pushing of the next blank into its place.

The feed rollers D are driven at a rapid rate by means of a belt pulley Q (Fig. 4) on the shaft of the lower roller, the belt allowing a considerable slip after the rod A has engaged the end stop E and can no longer be fed. The speed of the rollers is preferably such that the short portion A' at the rear end of a rod A (Figs. 14 and 15) will be fed past the shearing blades and dropped out of the way, and the new rod will be fed entirely up to the stop E before the shear blades come together. The receptacle below the shears is composed of narrow guides J, as explained, so that short ends, as A', will fall out sidewise and thus avoid interference with the subsequent operations.

When the shear blades H and G begin their shearing action there is a certain longitudinal movement of the blank, and this is allowed for by making the stop E movable at the proper moment (see Figs. 16 and 17). The stop is longitudinally adjustable in its supporting frame R to adapt it to blanks of different lengths. The supporting frame is arranged to slide in a longitudinal groove in a fixed support S, and is pressed outward by a spring T. A rotating cam U engages a roller V upon the frame R, and during the greater part of its revolution holds the stop rigidly in position. During an appropriate interval, however, a slot W in the face of the cam permits the spring T to press the stop E outward, this operation occurring as soon as the upper shear blade H has engaged the rod, and the stop being held in its outward position during the entire shearing action, so as to permit the outer end of the blank to fall with the inner end.

A massive shear frame X is provided, having a cross-bar Y carrying the lower fixed blade G, and having guides Z Z' for the sliding head $a$ which carries the upper movable blade H. The shear frame X also carries fastened on its inner face the bearings X' for the feeding rollers D, as shown. The fixed frame carries also lateral ears $b$ (Figs. 9 and 10) through which pass powerful shafts $c$ $c'$ provided with eccentrics giving a slight vertical reciprocation to links $d$ connected to the crosshead $e$ which carries the head $a$ of the upper shearing blade.

The reciprocating feed rod K is slidable in its support $f$, which is carried upon a longitudinal rod $f'$ which passes through a guide-lug $g$ on the outside of the shear frame X (Fig. 3), and through the front frame $h$, and is connected by means of a suitable cross-head $j$ (Fig. 8) and link $k$ to a transverse crank-shaft $l$, whereby it receives a long backward and forward movement. The rod K is pressed inward yieldingly on the inward movement of the support $f$ by any suitable means. As shown it is held by friction in its support $f$ and is also pressed inward by a weight $f^2$ depending from a chain attached at its end to the outer end of the rod K, and with its bight running over a pulley on the under side of the support $f$. On the outward movement of the support $f$ it engages a collar on the outer end of the rod so as to carry the rod with it. On the inward movement of the support the rod follows it, but yieldingly. Thus if a blank sticks in the jaws or in the magazine, the rod will yield rather than break; and, what is more important, by manually holding the rod withdrawn the squaring and punching operations cease, while the shearing continues, this operation being especially useful for filling the magazine.

The forward frame $h$ is of the shape indicated in Fig. 7, with a central opening and with angular lugs $m$ providing four radial grooves in which are fastened finished liners $n$ forming guides for the squaring dies. Each die M is carried in a head $o$ and is adjustable therein by means of wedges $p$ (Fig. 13) screwing in and out between the back of the die and a solid portion of the head $o$. Each head is guided by the guides $n$, and is connected by means of a link $q$ to an eccentric $r$. The upper pair of eccentrics are mounted on the shafts $c$ $c'$ which operate the shear. The lower eccentrics are mounted on similar shafts $s$ $s'$. The dies are removable so that various sizes and shapes may be used, and by means of the wedge adjustment described they are arranged to come together to any desired extent at the center.

The clamping mechanism comprises a pair of jaws L L (Figs. 5 and 8) carried in a box $t$ with forward and rear cover plates $u$ $v$, the latter being removed in Fig. 5. The box $t$ is bolted upon the forward face of the frame $h$, its position being indicated in dotted lines in Fig. 7. The clamping jaws L are identical, and are each provided with four faces having half-round grooves therein of different diameters, so that by turning them they may be made to serve for different sized blanks. One of the dies L is fixed in operation, being backed by a liner $w$ of suitable thickness between the die and the solid end of the box. The other die is backed by a liner $w'$, bringing it into engagement with a sliding head $x$ driven by a link $y$ and toggle arm $z$ upon a shaft 2 which passes through the main frame $h$ and is oscillated by means of an arm 3 connected to a link 4 the upper end of which embraces the shaft $c$ and is engaged and reciprocated at intervals by means of a cam 5 on said shaft engaging a roller 51 carried by the link 4. Pull-back plates $z'$ are used in connection with the toggle arm $z$.

The clamping jaws L are formed with beveled edges 6, and a pointed plunger 7 is arranged below the dies and pressed upward by a spring 8, its position being such that upon the release of the dies the upward pressure becomes effective to shift the movable jaw slightly, preventing the sticking of the die to the blank and permitting free movement of the latter.

The center punch O is given its forward movement at the proper time by means of a cam 9 carried upon the cross-shaft $l$. It is only when the punch is to be driven forward that it lies longitudinally in line with the blank. Immediately thereafter it is shifted laterally. To effect this operation it is arranged to slide through bearings in the ends of arms 10 and 11 mounted on a common shaft in the fixed bearings 12, and the arm 11 is connected to a link 13 the upper end of which straddles the shaft $c$ and is reciprocated by means of a cam 14 on said shaft engaging a roller 141 carried by said link.

The movements described may be obtained by various mechanisms, and the power may be transmitted thereto by various combinations of transmitting mechanism. In the arrangement shown the shafts $c\ c'\ s\ s'$ pass not only through the corners of the forward cross frame $h$ but similarly through a rear cross frame 15, and are provided with gears 16, 17, 18 and 19 respectively, all of which are driven from a central pinion 20 mounted upon a short shaft 21 carrying a second gear 22 in the rear of the faces of the other gears, and engaged by a pinion 23 upon a lower shaft 24, which in turn is driven by a large gear 25 driven by a pinion 26 upon a shaft 27 carrying a large belt pulley 28 from which the power for the machine is initially derived. The shafts 24 and 27 are supported at their rear ends in an additional standard 29. The symmetrical arrangement of gears described gives great strength and freedom from unbalancing bending moments.

From the lower shaft $s$ there is driven by means of bevel gears 30 31 (Figs. 3 and 4) a lower cross-shaft 32 which by suitable pinions drives the cross-shaft $l$ previously referred to. On one end of the shaft $l$ is a large belt pulley 33 from which the power is transmitted to the pulley Q for the feed rollers, as previously described.

An important feature of the machine is in the associating of the shears and the squaring mechanism in such a way that the imperfect end of the blank formed by the shearing operation is the end which is squared. In using the stay-bolts it is the squared ends of course which are on the outside, and these ends are usually cut off before the swaging operation, so that they need to be only sufficiently perfect to permit the forming of the squared head. Fig. 11$^a$ shows the rear end of the blank F, which, in practice, will be found sheared at a substantial angle. Such an end would be very objectionable for forming the thread which must be provided upon the inner end of the bolt, but may perfectly well be used for the formation of the head of the bolt, as explained.

The space between the rollers and the shears is preferably bridged by a holding-down plate 34 (Figs. 11 and 19) which is fastened to the cross-bar carrying the lower shear blade, and is properly apertured for the passage of the stock, and extends nearly to the line of the upper blade. This insures the holding down of the rear end of the stock after it has passed through the feeding rollers, so that the stock shall be held rigidly for the action of the shears.

The vertical guides J constituting the magazine are arranged to be adjusted for bolts of different diameters and of different lengths. They are preferably supported, as indicated in Fig. 18, upon a plate 35 extending into the space between the two sides of the shear frame X, and fastened by means of lateral flanges 36 upon the outer edges of said frame, with a capacity for vertical adjustment, all as indicated in Figs. 10 and 18. A central slot is formed in said plate 35 sufficiently large to permit the escape of blanks which are not held by the guides J constituting the magazine.

Though I have described with great particularity of detail a specific machine embodying my invention, yet it is not to be understood therefrom that the invention is restricted to the specific machine described.

Various modifications thereof in detail and in the arrangement and combination of the parts may be made by those skilled in the art without departure from the invention.

What I claim is:—

1. In a machine of the class described, in combination, means for cutting blanks from a rod, a magazine for receiving said blanks, radially moving jaws adapted to close on a blank and compress the same, means for punching the end of said blank, means for automatically feeding blanks from said magazine to said jaws and to said punching means and for ejecting each blank by the next, and means for withdrawing the punch out of the line of said blank to permit the ejecting of said blank endwise.

2. In a machine of the class described, means for feeding a succession of long rods, means for cutting bolt-lengths therefrom, the machine having a space through which the rear end of a rod moves out of line when it is shorter than a bolt-length, and actuating mechanisms for the feeding means and the cutting means respectively, the relative speeds of said actuating mechanisms being such as to effect the feeding of such rear end and also of a full bolt-length from the succeeding rod between successive operations of the cutting means.

3. In a machine of the class described, means for shearing bolts from a rod, two pairs of guides into which the bolts fall as they are sheared off and which are arranged one pair nearly a bolt-length from the other, with an open space between, whereby a rod substantially shorter than a bolt-length will fall out from between them.

4. In a machine of the class described, a pusher for pushing the bolts to the squaring position, a carrier in which said pusher is supported, and means for reciprocating said carrier, said carrier having a yielding engagement with said pusher on its forward movement and a positive engagement on its rearward movement whereby the pusher is positively retracted but on its forward movement is adapted to yield in case of obstruction to the movement of the bolt.

5. In a machine of the class described, a forward frame $h$, a rear frame 15, shafts $c\ c'$, $s\ s'$ extending between and carried by the corners of said frames, and squaring means carried by the forward frame and operated by said shafts.

6. In a machine of the class described, a shear frame, and shears carried thereby, a forward frame $h$ rearward of said shear frame, squaring means carried by said forward frame, a rear frame at the rear of the machine, said frames being transverse to the length of the machine, and longitudinal shafts carried by said forward and rear frames and operating said squaring means and shears.

7. In a machine of the class described, a shear frame, and shears carried thereby, a forward frame $h$ rearward of said shear frame, squaring means carried by said forward frame, a rear frame at the rear of the machine, said frames being transverse to the length of the machine, longitudinal shafts carried by said forward and rear frames and operating said squaring means and shears, and a center punch and secondary shaft for operating the same, both carried between said front and rear frames.

8. In a machine of the class described, a magazine comprising guides J adjustable horizontally to accommodate blanks of various diameters and of various lengths, and a support 35 for said guides adjustable vertically.

In witness whereof, I have hereunto signed my name in the presence of two subscribing witnesses.

JAMES A. EDEN, Jr.

Witnesses:
DOMINGO A. USINA,
THEODORE T. SNELL.